United States Patent [19]
Dederick

[11] Patent Number: 5,512,787
[45] Date of Patent: Apr. 30, 1996

[54] FACILITY FOR REFUELING OF CLEAN AIR VEHICLES/MARINE CRAFT AND POWER GENERATION

[76] Inventor: Robert Dederick, P.O. Box 367, Port Ewen, N.Y. 12466

[21] Appl. No.: 325,830

[22] Filed: Oct. 19, 1994

[51] Int. Cl.$^6$ .............................. F01D 15/10; F03B 13/12; F03D 9/00
[52] U.S. Cl. .................. 290/4 R; 290/53; 290/55
[58] Field of Search ................................ 290/2, 4 R, 42, 290/43, 44, 53, 54, 55, 1 R

[56] References Cited

U.S. PATENT DOCUMENTS

| | | | |
|---|---|---|---|
| 3,070,703 | 12/1962 | Podolny | 290/2 |
| 3,484,617 | 12/1969 | Winsel | 290/55 |
| 3,754,147 | 8/1973 | Hancock et al. | 290/42 |
| 4,123,667 | 10/1978 | Decker | 290/53 |
| 4,159,427 | 6/1979 | Wiedemann | 290/55 |
| 4,184,084 | 1/1980 | Crehore | 290/55 |
| 4,185,947 | 1/1980 | Menk | 417/333 |
| 4,189,925 | 2/1980 | Long | 60/652 |
| 4,206,608 | 6/1980 | Bell | 290/4 R |
| 4,305,003 | 12/1981 | Basurto et al. | 290/54 |
| 4,776,171 | 10/1988 | Perry, Jr. et al. | 60/698 |
| 4,804,855 | 2/1989 | Obermeyer | 290/54 |
| 5,084,630 | 1/1992 | Azimi | 290/53 |
| 5,272,879 | 12/1993 | Wiggs | 60/698 |

OTHER PUBLICATIONS

Aqua Magnetics, Inc. "The Wave of the Future" brochure.

Primary Examiner—Thomas M. Dougherty
Assistant Examiner—Christopher Cuneo
Attorney, Agent, or Firm—Schmeiser, Olsen & Watts

[57] ABSTRACT

A facility for the generation of electrical power and products for the refueling of clean air vehicles (CAV's) and marine craft and for use by the facility and/or general market. A host of electrical power generation devices including solar panels, solar collectors, wave action generators, reverse osmosis water purification apparatus, electrolizers, hydrogen/oxygen purifiers and compressors, storage units, fuel cells, AC/DC motors and generators and the various connectors, gauges and networks used for interconnecting and dispensing the products of a combined source system are used jointly and severally in a unique siting about an elevated roadway or railway. The idealized site for this combined system is a bridge, or other elevated structures such as lock superstructures, dam faces and otherwise towering facilities. The siting structure is most desirably located adjacent a water source, be it a river, bay, tidal estuary or the like. In addition to the generation of DC electrical power, gaseous products such as may be marketed for their intrinsic value or used in the production of additional power via fuel cell operation are also marketed or used/consumed on site. Unique improvements are made in wind generators, a tidal barge generation system and a wave air generator.

20 Claims, 8 Drawing Sheets

FACILITY FOR REFUELING OF CLEAN AIR VEHICLES/MARINE CRAFT AND POWER GENERATION

BACKGROUND OF THE INVENTION

1. Field of the Invention

The instant invention relates, generally, to composite facilities that are used to refuel low- and non-polluting vehicles and marine craft. Specifically, the invention relates to a facility which generates direct current electrical power from a number of non-polluting, renewable sources, such as wind, water and solar sources. Most uniquely, the invention is situated in close proximity to and, in large part, on a generally man-made structure such as a bridge, highway overpass system, dam face, multiple tower array or any edifice possessing bridge-like superstructures. Fullest potential of the invention is acquired when the facility is colocated adjacent a body of water, preferably moving.

2. Discussion of the Relevant or Related Art

The following related art summaries are merely representative of portions of the invention disclosed in each reference. These summaries do not suffice for a thorough reading of each individual reference.

U.S. Pat. No. 4,189,925, issued to Long discloses a method for storing electric power and later utilizing the stored power to convert the electric power to chemical energy of molecular hydrogen, reacting the hydrogen with a source of carbon to produce a hydrocarbon compound such as methane or methanol, storing the hydrocarbon compound and then supplying the hydrocarbon compound to fuel a generator which operates to produce electrical power.

U.S. Pat. No. 4,776,171, issued to Perry, Jr. et. al. discloses a solar powered wind driven engine. Desalinization and electrolysis of the water is provided. The system produces carbon dioxide and hydrogen which are used to generate methanol. The methanol can then be used as a fuel to drive an internal combustion engine. This patent further discloses an integrated power system that is uniquely sited, that is, it is located adjacent a body of saline water by its installation on an island or, by inference, a similarly situated piece of land.

U.S. Pat. No. 4,123,667, issued to Decker, discloses a wave energy generator which produces electric power from wave motion. A distortable underwater section has flexible compartments containing liquid and gas and which are equipped with flexible, internal, one-way flow walls separating the compartments. In response to wave motion, the internal fluid of the compartments flow in one direction through the compartments and through a fluid flow-powered motor-generator combination.

The Aqua Magnetics brochure discloses a reciprocating generator which allows for direct conversion of the energy in ocean swells to electric energy. In a six foot ocean swell, one reciprocating generator is capable of producing 400 KW of electric power.

U.S. Pat. No. 4,185,947, issued to Menk, discloses an apparatus for transferring the kinetic energy of waves in a body of water into other forms of energy. Specifically, the invention relates to such apparatus which automatically takes advantage of the variations in the average level of the body of water.

U.S. Pat. No. 4,206,608, issued to Bell, discloses an apparatus and method for utilizing natural energy in the production of electricity having an alternating current (AC). The natural energy is utilized to pressurize hydraulic fluid. The hydraulic fluid is temporarily stored within high pressure storage tanks to be used in the production of electricity.

U.S. Pat. 4,305,003, issued to Basurto et. al., discloses a power producing system which employs floats that move up or down in tanks, responsive to wave or water motion. The tanks may be located wherever desired in order to take advantage of water motion.

U.S. Pat. No. 5,272,879, issued to Wiggs, discloses a geothermal power system which uses a fluid refrigerant capable of changing phase between liquid and gaseous states. This system includes a heat exchanger exposed to a heat source such as earth, water, air or industrial waste for vaporizing the fluid in the heat exchanger.

3. Incorporated Material

Of the above summarized U.S. Pat. No. 4,189,925 (Long), for METHOD OF STORING ELECTRIC POWER; No. 4,776,171 (Perry, Jr. et. al.) for SELF-CONTAINED RENEWABLE ENERGY SYSTEM; No. 4,123,667 (Decker) for WAVE ENERGY GENERATOR-BRAKE WATER-BARGE-DOCK; No. 4,185,947 (Menk) for WAVE-ACTUATED ENERGY TRANSFER APPARATUS; No. 4,206,608 (Bell) for NATURAL ENERGY CONVERSION, STORAGE AND ELECTRICITY GENERATION SYSTEM; and No. 4,305,003 (Basurto et. al.) for ENERGY GENERATION SYSTEM are hereby incorporated by reference for pertinent and supporting information.

4. Limitations within the Field of the Invention

A major source of air pollution and smog in metropolitan areas in the United States and world-wide is the burning of fossil fuels for transportation vehicles. In order to reduce this pollution, state governments have established or adopted clean air standards requiring car and truck manufacturers to strive to produce low emission vehicles (LEVs) or zero-emission vehicles (ZEVs). Although LEVs are available, they are largely experimental and are generally limited to municipal government trial programs or utility company usage simply because of specifically established refueling sites for these types of vehicles. Thus, despite the lower operational and maintenance costs, and the environmental advantages of these vehicles, no broad market exists for them because of the problems involved in refueling them.

Although ZEVs exist in the experimental stage, many problems must still be resolved before they become commercially available. Most ZEVs rely upon a variety of storage batteries to supply the electrical energy. These batteries cause a major expense in addition to the cost of the vehicle, have limited life expectancy and have a limited driving range because of the paucity of refueling and recharging facilities. Most of them are designed to be recharged overnight, using off-peak, fossil fuel-generated electricity from the local power grid, the logic here being that it is easier to control power plant emission than vehicle emissions. The fuel cell (FC), an energy generator which employs hydrogen and oxygen (or air) to produce direct current (DC) to power a vehicle appears to be the system which I feel will prevail. Although the fuel cell is currently expensive to produce, commercialization will reduce the cost. Some problems exist with the onboard storage of hydrogen, but such have been overcome in selective situations and will be more easily resolved as a market for the fuel cells develops. Among the major problems facing the development of the market for fuel cell driven vehicles is the limited availability of the fuel cell and accessibility of hydrogen to power it.

Although little has been done to limit the pollution generated by marine craft, especially pleasure power boats, the present design will easily provide an extensive infrastructure of non-polluting refueling facilities for both these and commerical craft. A new generation of pleasure power boats and commercial craft designed to be propelled by electricity supplied by fuel cells or internal combustion/ diesel engines converted to run on hythane or hydrothane will reduce this pollution.

I have overcome major limitations within the art in the field by providing a system that will refuel the three classifications of clean air vehicles referred to herein: hybrid vehicles fueled by a combination of gasoline and either Compressed Natural Gas (CNG) or Liquefied Natural Gas (LNG), low emission (LEV), and zero-emission (ZEV). Since the market for the refueling of LEVs and ZEVs may lag the introduction of facilities such as I have envisioned, the power generated by the facilities can be used as an adjunct to the area power grid and serve to amortize the cost of their installation. The preponderance of components which make up a CAV (clean air vehicle) and marine craft refueling system currently exist and are commercially available. Elements which will be hereinafter incorporated in the instant system and which are commercially available are: solar panels, for DC photovoltaic; solar collectors, for DC derived from oil/steam turbine; wave action generators, such as patented by Aqua-Magnetics of Tampa, Fla.; reverse osmosis apparatus, for pure deionized water; electrolizers, for the production of gaseous products such as hydrogen and oxygen; hydrogen purifiers and compressors; storage units; fuel cells (FCs); AC/DC motors and generators; and accessory connectors, valves, gauges, meters etc. In devising a composite system that would meld the diversity of nonpolluting, renewable energy sources with a highly functional situs which would facilitate one of several possible combinations, it was necessary for me to make developments or improvements to other existing devices such as: wind generators, tidal generator barges and wave/air generators. Of the relevant patents discussed above, none provide the totality of power source subsystems that I do save for that disclosed by the composite system of U.S. Pat. No. 4,776, 171 issued to Perry, Jr. et. al. Notwithstanding the multiplicity of subsystems available, it was my idea to combine the many energy devices into a compact vertical and horizontal system rather than the purely horizontal system envisioned in '171. Thus, dispensation can be made of the coral quarry, the lobster pond, distillation columns, (fresh) water storage tanks, metal oxide storage facility and, not the least of all, the air strip. Such a wide area facility is right and proper for what amounts to a fuel refinery, but would not suit my needs as to the titled instant invention.

SUMMARY OF THE INVENTION

I have overcome problems and shortcomings of the relevant art relating to generating electricity and fuels for nonpolluting vehicle and marine craft refueling by inventing a physically compact, essentially fixed site system that contemporaneously provides electrical and fuel products for immediate site-servicing of such environmentally friendly vehicles. On an elevated structure possessing a substructure and, when available a superstructure, that is adjacent or proximate a roadway or waterway, there is provided one (or more) electricity generating subsystem(s) such as a solar panel collector, a wind generator, a tidal barge or a water power/wind-wave generator that is (are) located on or otherwise attached to the structure. The electric power produced is generally DC and is attended by the electrical network necessary for conducting the power to battery supplies, electrolysis equipment and charging stations. An adjacent water supply means is preferred, such as a stream, fjord, river, lake, bay, tidal estuary or the like. Compression and storage means for handling gaseous products produced such as hydrogen or oxygen are also part of the facility proper. In cases where a larger body of water capable of taking advantage of tidal flow is the adjacent water system, a compact floating energy generation system consisting of a barge mounted with various electrical energy producing devices is also contemplated. The barge equipment includes wind generators, wave generators and a bucket train that is internal of the barge proper. Should the situs of the facility be near a bay or body of water subjected to significant wave action, I have provided an additional auxiliary energy production subsystem termed a wave powered air generator. In this regard, having not been the initial inventor, I have made a significant improvement to the air generator subsystem which makes it a valuable adjunct to the other subsystems of my facility.

Knowledge of the present invention will become more readily apparent upon reading the following detailed description having reference to the above drawings.

DESCRIPTION OF THE PREFERRED EMBODIMENTS

1. Definitions

Certain definitions and acronyms will be referred to throughout the remainder of this discussion. A clean air vehicle (CAV) and marine craft is defined as a vehicle which is not fueled with conventional fossil fuels, e.g. gasoline or diesel petroleum products. Vehicles which use ethanol or methanol, or any "clean-burning" additive are also eliminated because these fuels are regionally available at conventional service stations. CAVs and marine craft may be divided into three classifications: hybrids, low-emission (LEV) and zero-emission (ZEV) types. Hybrid vehicles are those which are fueled by a combination of gasoline and either compressed natural gas (CNG) or liquified natural gas (LNG), natural gas being used in urban areas and the gasoline in suburban areas where refueling facilities for the natural gas are rarely available. Distinctively, LEVs are those powered by a combination of hydrogen and methane or natural gas called Hythane (5%–10% hydrogen—currently in experimental stages in both Pennsylvania and California) and Hydrothane (35%–50% hydrogen—currently in the experimental stage at the Florida Solar Energy Laboratory). LEVs are obviously internal combustion engines. In further distinction thereto, ZEVs are propelled by electricity drawn from either a fuel cell or a storage battery pack. In the fuel cell, energy is produced by recombining hydrogen and oxygen (or air) to produce direct current (DC) and water. Vehicles with storage battery packs are generally recharged overnight with off-peak power from the local grid. With improvements in battery technology, significantly shorter charging times and expanded ranges are evolving. My present invention is conceived as operating as a stand-alone refueling facility to refuel LEVs and, in the case of ZEVs, to provide or otherwise furnish exchangeable battery packs and/or fuel cell replacement tanks.

2. Components of the CAV and Marine Craft Refueling System

The majority of the mechanical components of my CAV and marine craft refueling system currently exist and are commercially available. This system combines these elements at sites which provide maximum operational efficiency and accessibility for the vehicles they will serve. The major elements of the system which are commercially available are: solar panels (for DC photovoltaics); solar collectors (for DC derived from oil/steam turbine); wave action generators; reverse osmosis water de-ionizers; electrolizers (electrolysis units); hydrogen purifiers and compressors; storage units for gaseous products; fuel cells; AC/DC motors and generators; battery packs or banks and accessory connectors along with valves, gauges, meters and other electrical networking devices. In addition to the unique combination of the aforesaid elements, I have invented and/or improved the following components for integration with the CAV and marine craft refueling system: vertical axis wind generator; tidal generator barge; and a wave/air generator to be totally integrated with my system invention. In another embodiment, recharged exchangable battery packs or precharged $H_2$ tanks may be used with the CAVs and marine craft. In a novel siting concept, I have ideally positioned my CAV and marine craft refueling infrastructure at abridgement, overpass, elevated structure and/or superstructure or other constructions that are proximate major roadways (wherein the need for localized refueling would arise) which have significant vertical height and surface available for the placement thereon of solar collecting mechanisms, but also have considerable horizontal structure for the mounting thereon or thereunder of my unique vertical axis wind generator designs. Complimentarily, these structures would also, by their very nature, be proximate water in the form of tidal flows or basins, rivers, large creeks or estuaries and be subject to higher than the normal surface winds, while being free of shadowing influences. As will be seen in the drawings, primarily FIG. 2, a bridge by its nature provides the various hard points for mounting equipment while affording the facility (the invention CAV and marine craft refueling system) its required compliment of energy sources and physical advantages: since it is high, it is rarely overshadowed and is perfect for solar panels or collectors; since bridges are unobstructed from the sides, and passage of high winds therethrough is normal, light-weight wind generators function well when positioned on the horizontal surfaces of the bridge; they are frequently constructed over bodies of water and such bodies of water can power tidal, wave or hydro-generating subsystems; there is generally space beneath them for production or storage facilities; the necessary highways pass over them which would provide access for the vehicles the CAV and marine craft facility is intended to serve; and because they are facilities associated with high volumes of traffic and communication, there is often a ready access to the power grids of the region in which they are located.

3. Integration of the Components and Subsystems

Figure 1A:
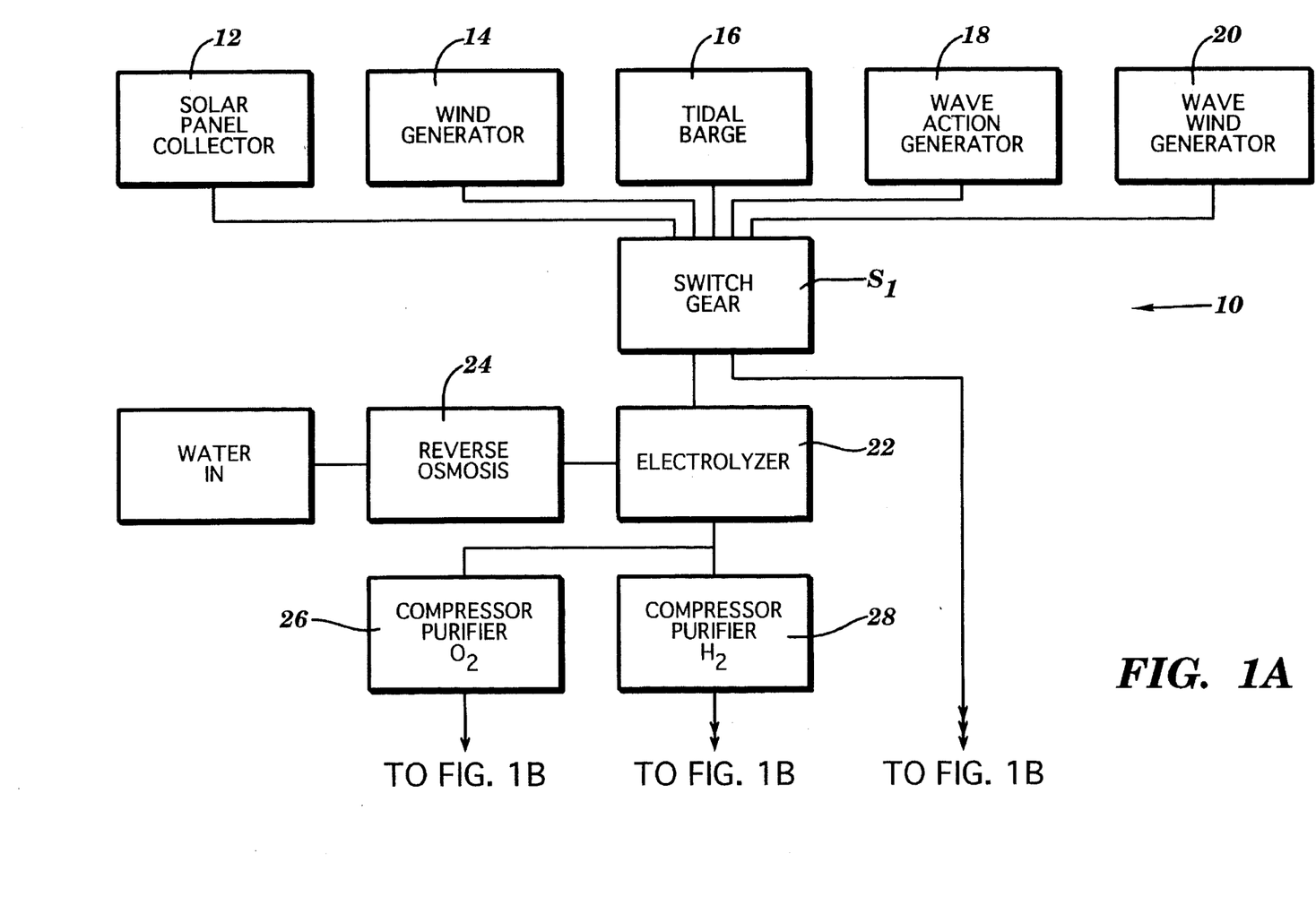
FIGS. 1A and 1B are a block diagram of a typical installation of the invention.
Figure 1B:
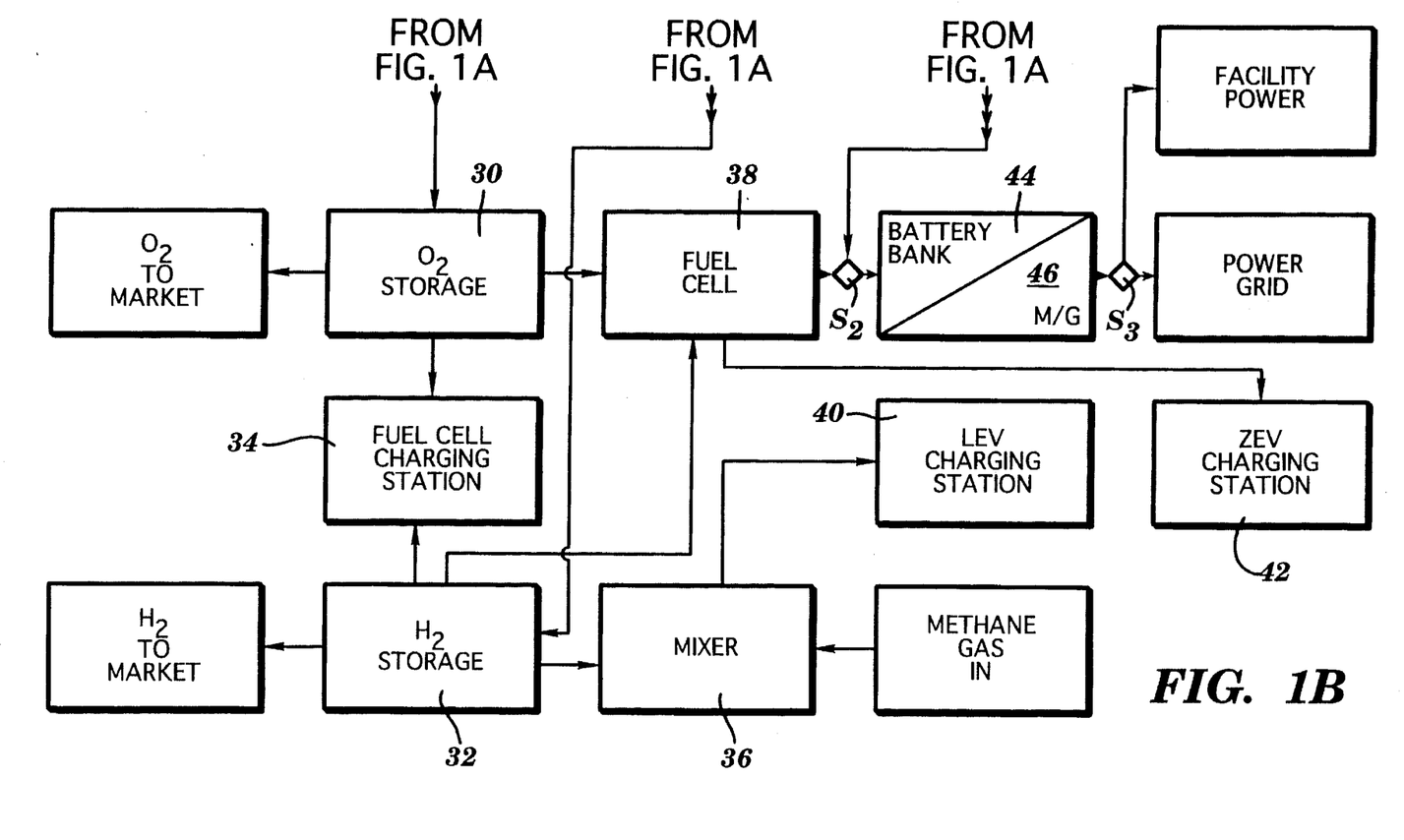

Having reference now to FIG. 1, a series of direct current producers—a solar panel collector 12, a wind generator 14, a tidal barge 16, a wave action generator 18, and a wave wind generator 20—are shown electrically ganged to a switching center $S_1$. This first switching center $S_1$ is capable of routing the totality of generated DC power to either electrolizer 22 or a second switching center $S_2$. Following the former channel, electrolizer 22 receives direct current power and pure water from reverse osmosis apparatus 24 in order to produce gaseous products, normally hydrogen and oxygen. These products are then directed pneumatically to an oxygen compression purifier 26 and a hydrogen compressor purifier 28. Thereafter, the oxygen is directed to oxygen storage 30 and the hydrogen to hydrogen storage 32. Such storage may consist in a series of fixed or portable high pressure tanks. Thus, the stored oxygen and hydrogen are available as shown in FIG. 1 for either removal to market or further transfer within the indicated system. Following the latter path, both oxygen and hydrogen are transmissible to a fuel cell array 38 or, hydrogen alone is conducted to a fuel cell charging station 34 and a mixer apparatus 36 which receives therein a flow of methane (natural gas) for mixing with the hydrogen to furnish the mixture to an LEV charging station 40. Although not depicted herein, the ZEV charging station 42 could alternately draw and use direct current taken from the second switching system $S_2$. The reason for the depicted set up is that, as will be seen in the further discussion of FIG. 1, power from the DC generator bank of various collectors 12–20 may be insufficient at any particular time to operate the three main charging stations. At such time, full reliance would be made upon the hydrogen/oxygen storage subfacilities and the system would downmode to a simple production mode only. In other instances, for example when there is little demand for the charging stations or hydrogen and oxygen products, the generator bank power would be shunted through switching system $S_1$ to switching system $S_2$. Switching system $S_2$ is an electrical network which sends DC power from either the generator bank 12–20 or the fuel cell bank 38 to a battery bank 44. Thus, the system 10 is capable of long term and continuous storage of direct current power which can then be immediately used to power a motor generator complex 46 which will produce alternating current. The alternating current is sent from the motor generator through a third switching network $S_3$ that will shunt the power (AC) to either the immediate facility bus and/or a nearby commercial power grid.

Figure 2:
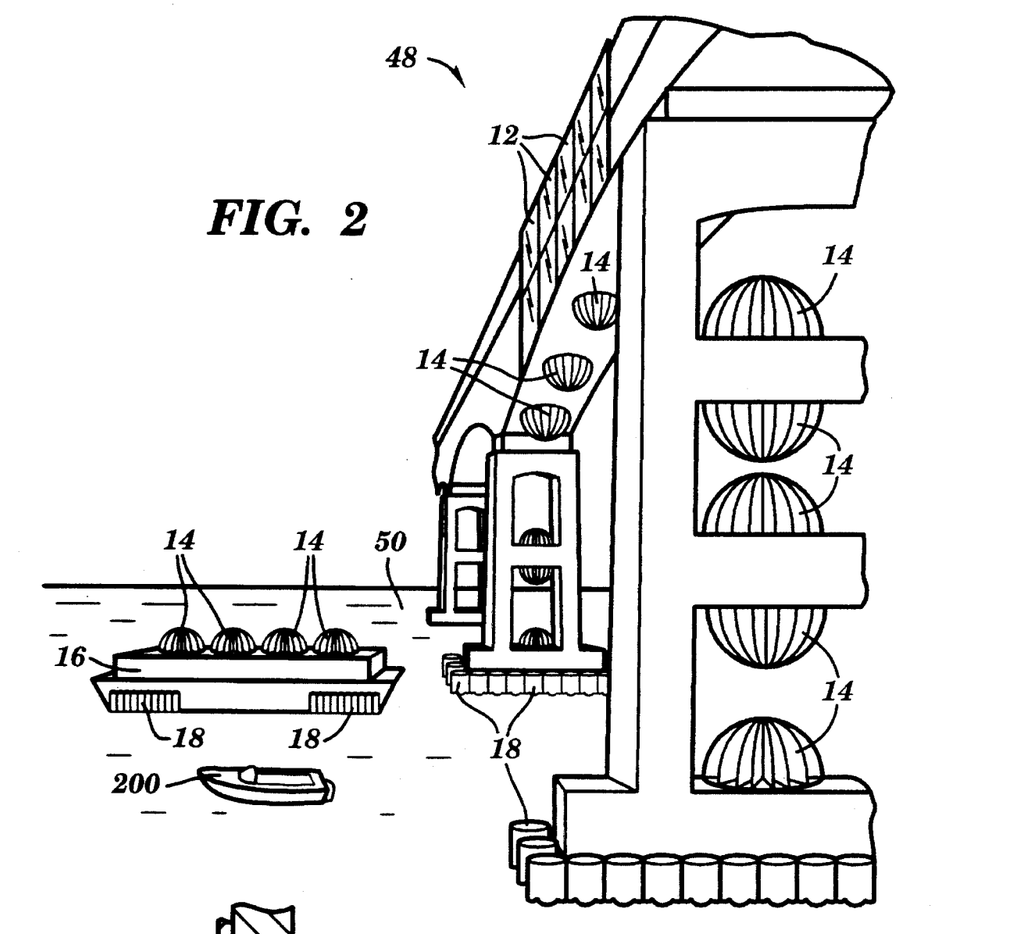
FIG. 2 is an illustration of a preferred embodiment of the invention with the tidal barge adjunct.

A typical preferred emplacement of the invention 10 is illustrated in FIG. 2. There, a bridge 48 seen spanning a river or tidal estuary bears thereon a complex of solar panels 12 and vertical axis wind generators 14. The solar panels are arrayed along the superstructure while at the bases (pediments) of the vertical supports, at essentially water level, is disposed a series of wave action generators 18. Situated close to the bridge, but for illustration purposes only, is a tidal barge 16. Although primary equipment of the barge is not shown herein, it may be seen that the barge itself affords an excellent base for secondary power generation subsystems such as the wind generators 14 and wave action generators 18.

Figure 3:
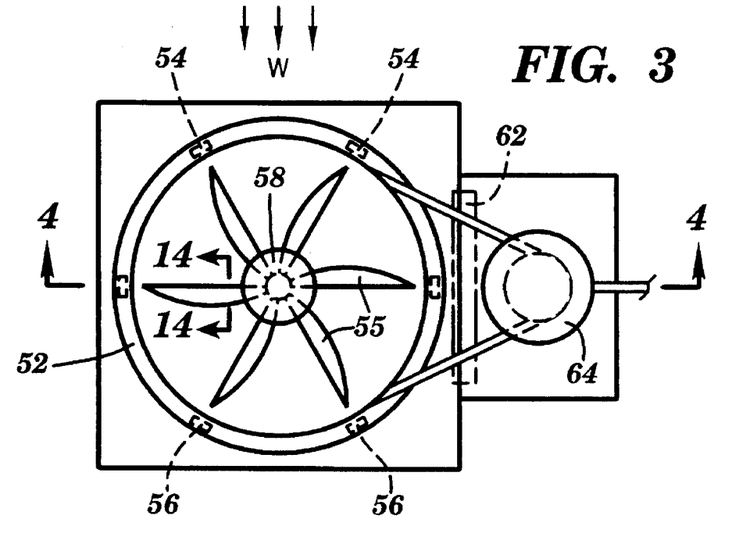
FIG. 3 is a plan of a vertical axis wind generator.
Figure 4:
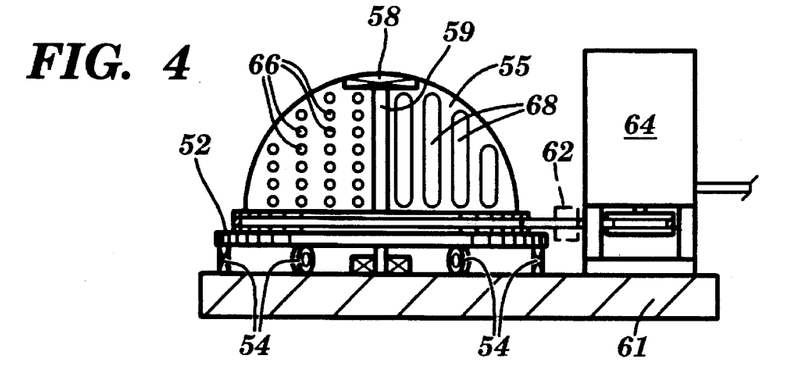
FIG. 4 is a vertical mounting elevational depiction of the vertical axis wind generator.
Figure 5:
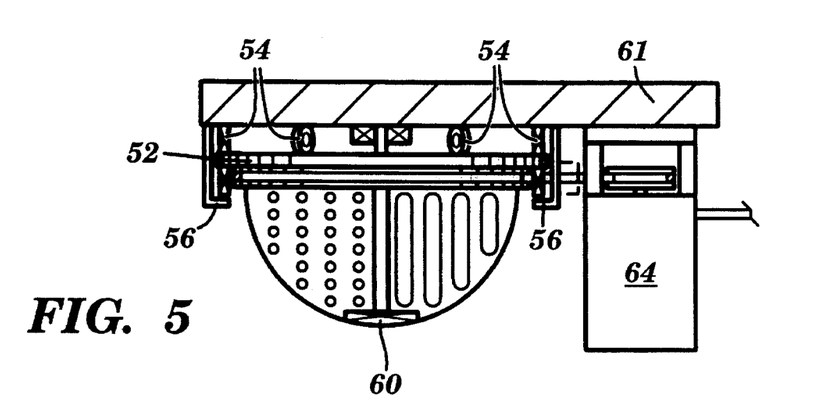
FIG. 5 is an inverted mounting elevational depiction of the vertical axis wind generator.
Figure 14:
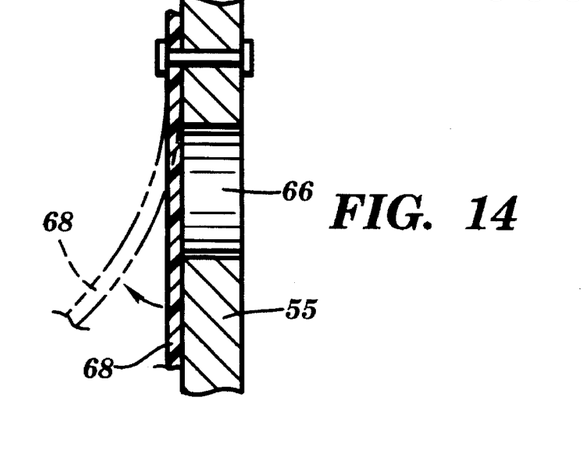
FIG. 14 is a sectional detail of a foramen cover in the vertical axis wind generator.

Turning now to more specific devices of my invention, FIG. 3 illustrates my vertical axis wind generator in plan view. FIGS. 4 and 5 are elevational illustrations of the FIG. 3 apparatus in a top mounted and a bottom mounted configuration, respectively. The vertical axis of rotation allows the wind generator to react to winds from any direction. In FIG. 3, a wind generator subsystem is seen featuring an annular ring 52 which rides on a series of support rollers 54 (not shown) and is movably secured by a series of concentric rim supports 56. Radiating from a central spindle 58 is a plurality of foramenous vanes 55 which are rigidly mounted to the spindle 58 and to the ring 52. The vanes 55 have an air foil shape, that is, a cupped or concave configuration that will cause the apparatus to rotate so that a concave portion will always be presented to the wind and the wind-engaging vane transports a segment of the annular ring so as to bring its diametrically opposite vane's convex face into the wind. For this reason, I term the wind-catching, concave portion of a vane 55 as its windward face and the other convex side, its leeward surface or face. As those convex vanes diametrically opposed to the wind "catching" vanes come into the wind stream W, I have devised a means of uncovering the foramens within the vanes. The foramen covers consist in a light, flapper valve array (see FIG. 14) that are hingedly mounted over the foramens on the windward (concave or cupped) surface of the vane. Thus, as the vane moves with the wind, literally "catching" the air movement, the cover is closed and the integrity of the vane surface is undiminished. As the vane convex or leeward surface moves into the wind stream, the air force on the normally leeward surface passes through the foramens, the covers hingedly flapping open. Referring specifically now to FIGS. 4 and 5, the remaining features of my wind generator can be readily seen in the low dome-like profile, which is designed to mount over or under a horizontal support structure 61. My design functions so as not to place undue lateral strain on the support structure, especially functional in the case when such support structure is a bridge 48 (FIG. 2). Angular momentum of the rotating dome is taken off via transmission 62, in this instance a belt and pulley arrangement, which is coupled to generator 64. Those of ordinary skill will recognize this as being a simplistic expression of such power take-off and understand that it is merely representative of the types of transmissions which may be used. In small, compact emplacements, I favor the use of belts and wheels in this typical pulley arrangement, since they are readily and inexpensively replaceable. However, more efficient transfer can be made through a traditional gear transmission wherein the primary mover is the annular ring and it supports thereon an annular gearing arrangement (not shown prior art). Thus, the generator main shafts may be directly linked to the annular mounting ring by a gear transmission which, although more expensive, would not be as susceptible to the elements as a belt and wheel transmission. For the most part, my wind generator is constructed of lightweight material such as PVC (plastic) and is available in three diameters to allow for a variety of available spaces for mounting. The energy developed by the wind generator is transmitted to the lightweight, high-output DC generator by either of the transmission means previously mentioned. Referred to earlier, a problem faced by vertical axis generators is that the energy developed by the rotating ring is reduced both by the resistance of vanes turning into the wind and the partial vacuum developed behind those vanes by their air foil configuration. Note FIG. 14 wherein I eliminate this problem by placing perforations or foramens 66 in the vanes to allow the air pressure on each side of the vane to equalize as it turns into the wind. The detail illustration of this figure portrays how, as the foramenous vane 55 turns its normally leeward (convex) face into the wind, a cover of lightweight plastic 68 (e.g. mylar, polyethylene, etc.) is forced away from the surface, allowing the air pressure or wind stream to pass through the foramen 66. Thereafter, as the concave or windward surface of the vane begins to "catch" the wind, the foramen cover 68 is forced to the face of the vane thereby covering the foramen and restoring the solid wind-resistance surface of the vane. Any number of means may be used to hingedly fix the foramen cover 68 over the foramen 66. I have shown in FIG. 14 a pop-riveted cover, for illustration purposes only, which would be as suitable as any other means used in the industry today.

Figure 6:
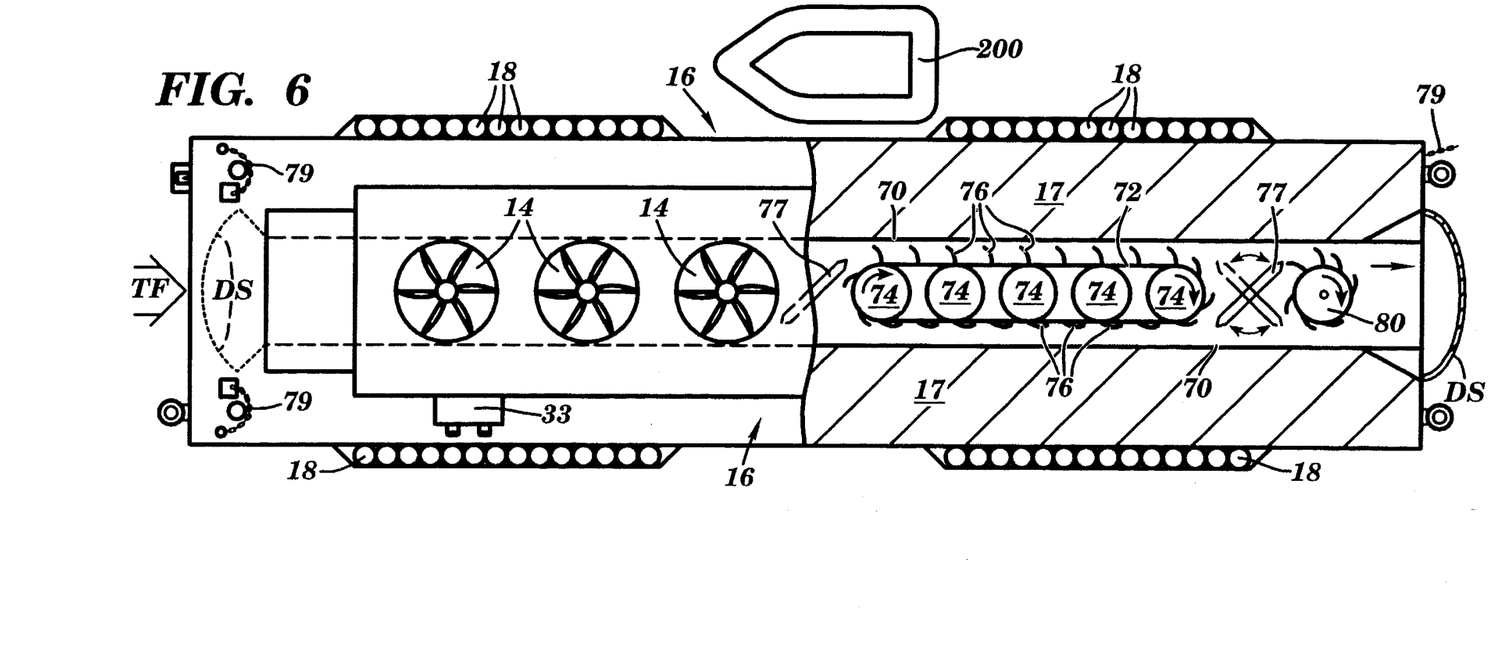
FIG. 6 is a plan of the tidal barge.
Figure 7:
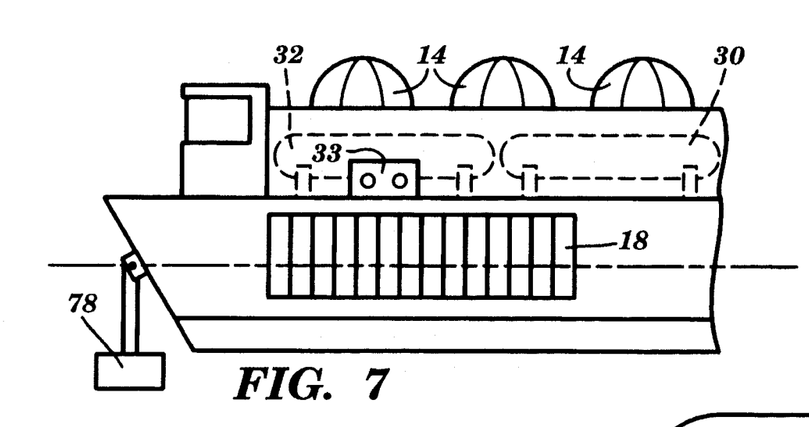
FIG. 7 is an elevational illustration of the tidal barge.
Figure 8:
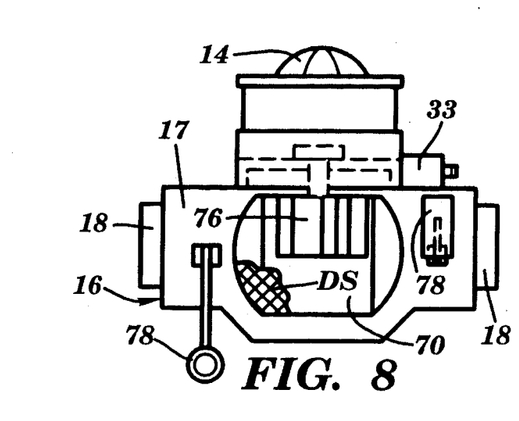
FIG. 8 is a frontal elevation of the tidal barge.
Figures 11, 15, 16:
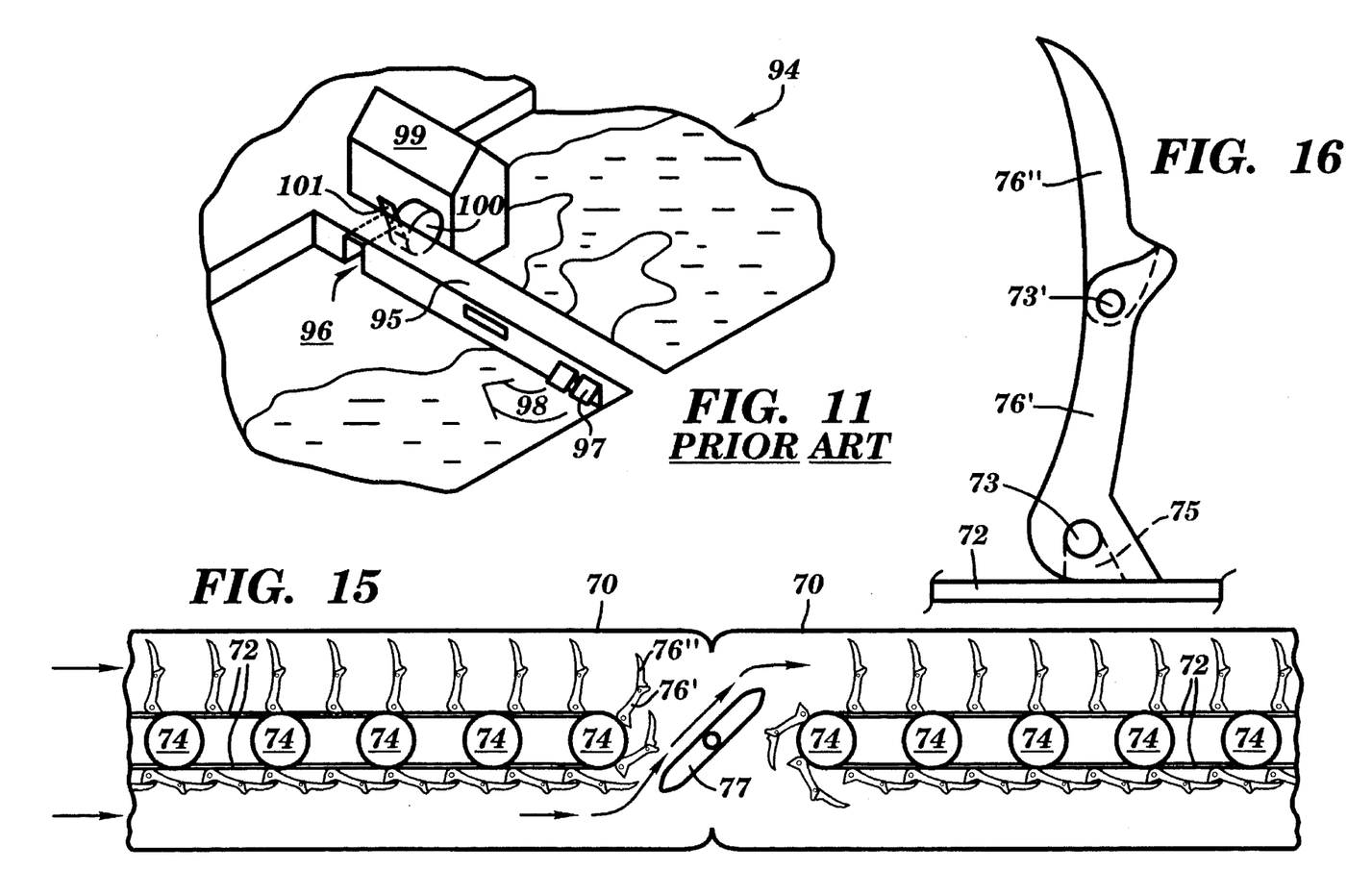
FIG. 11 is a schematic illustration of a tidal mill of the prior art.
FIG. 15 is a plan detail of the bucket mechanism in the tidal barge.
FIG. 16 is a detail illustration of an articulated bucket (vane) apparatus of the FIG. 15 mechanism.

I term my overall invention 10 a system and the various supportive units for the production or generation of products or power as, generally, subsystems. The vertical axis wind generator discussed above is one of the subsystems of my invention while the tidal barge 16 is another having, perhaps, a more significant importance. FIGS. 6, 7 and 8 are the tidal barge illustrations in partial plan, partial elevation and sectionalized vertical elevation, respectively. A tidal barge is an energy generating facility designed to be anchored in a location where the water flow would be sufficient to turn the generating equipment. The theory of operation, in the primary system, is similar to a water wheel in that a series of vanes, termed herein "buckets" to distinguish them from the wind generator apparatus, are turned by water power. Rather than being mounted on a circular structure, these buckets are mounted vertically on two or more consecutive, oblong belts which run lengthwise in a tunnel disposed in the barge. The barge is firmly anchored to provide a fixed point of resistance against the tidal flow. Further, the barge is fore-aft symmetrical, which allows it, and its associated apparatus to be directed into the tidal flow and thereafter fixed. The idea here being that, as the tide moves inward and outward, the tidal barge power generating equipment will be fixed to take advantage of the flow and thus require no further movement other than fine adjustments to maintain it in the direct tidal stream. Referring to FIG. 6, the barge 16 is shown in plan view having a boat 200 docked thereat. The main power generating subsystems include: vertical axis wind generators 14 mounted on the upper flat surfaces; wave action generators 18 serially mounted along the flanks of the barge and protruding into and below the water line to take advantage of any wave action encountered; and, most significantly, a tunnel 70 passing completely through the barge in the form of a conduit through which the tidal waters may pass and yet not enter into the hold 17 of the barge. Positioning anchor mechanisms 79 assure that the barge is aligned so that the tunnel 70 is brought directly into tidal flow TF. As the water stream enters the tunnel 70 it encounters a debris screen DS, a rotary tidal mill generator 80 (shown only at the discharge portion of the tidal flow of FIG. 6) and then the main tidal generator apparatus. The tidal generator apparatus consists in a series of flexible belt 72—mounted buckets 76', 76" that are articulatively constructed (see FIG. 16) so as to open and engage the tidal flow, when running with the flow, or close when opposing the tidal flow. The belt 72 is drawn continuously about a series of pulleys or wheels 74. Power is thereafter taken off the rotating wheels by conventional means and converted to direct current. Many mechanisms known to those in the art are available for the power conversion means, including the use of individual generators connected at, to or as part of the wheels of the bucket assembly. Further to the bucket assembly, the entire structure of wheels are ganged so as to raise the entire assembly out of the tunnel 70 for maintenance purposes. The raised position is depicted more clearly in FIG. 8. After the tidal flow passes the bucket assembly, it encounters deflector 77 which ensures that sufficient and dynamic flow is yet available for the turning of tidal mill 80. A mirror image of the aforesaid bucket assembly is located in the covered half of the barge, such redundant assembly allowing the barge to be oriented as shown relative to the tidal flow and to operate properly when the tidal flow reverses. Reference to FIG. 7 clearly discloses some of the items and elements of this subsystem that have not been mentioned. Most notably, storage tanks 32/30 for hydrogen/oxygen are shown in the enclosed portion at the left portion of the intermediate deck. This is in anticipation of the barge containing a significant amount of the system depicted in FIG. 1; however, such ingredients of the tidal barge will allow for the refueling of clean-air/zero emission pleasure power boats on commerical craft. Suffice it to say that the production of DC power that is readily transferable to the shore/land-based main system facility is most desirous until such a purpose or market develops. For this reason, I mentioned that the center stream anchorage of the tidal barge, as depicted in FIG. 2, was simply for illustration purposes. Final to FIG. 7, the fore and aft emplacements of water turbines 78 are a necessary adjunct. These water turbines are reverse cycle devices which when placed in the water and below the hull, allow this apparatus to be used as a DC power generation means or, alternatively, as a motive means for moving the barge 16. Final to the tidal barge, FIG. 8 provides to the reader a front elevation of the barge 16 clearly defining the tunnel 70 which is set off from the hold 17. Therein, the vertical bucket generator belt 72 is shown in the raised position while one water turbine 78 is shown in its operational (lowered) position and the other in a stowed position. A gas transfer facility 33 is depicted for cases in which the storage tanks 32/30 (discussed with FIG. 7) are used. FIGS. 15 and 16 are details of the bucket assembly and the articulated bucket, respectively. In FIG. 15, the reader is given a closer view of the bucket assembly at mid-barge location. The pinched tunnel configuration shown proximate flow diverter 77 (identical to the diverters located fore and aft of the tunnel) is somewhat exaggerated; its main purpose is to alter the fluid dynamics before the tidal flow encounters the second bucket assembly. Herein it may be seen that the belt 72 is mounted on the wheels 74 in pulley fashion and the individual buckets 76 actually comprise a tip portion 76" and a root portion 76'. The actual detail of the articulated bucket device is shown in plan view at FIG. 16. The belt 70 carries a series of brackets 75 thereon onto which the root or base bucket 76' is hinged by pivotation pin 73 at the unattached end of bucket root 76'. Bucket (extension) 76" is also pivotally attached by pin 73'. Thus, it is readily seen that a flow coming from the right would tend to move the entire bucket to the left, pivoting first at bracket 75. Then, as the bucket rounds a terminal wheel 74 of the bucket assembly, the extension portion 76" articulates, but only to the extent necessary to round the end wheel as shown in the right hand portion of FIG. 15. As the concave portion (left hand side) of the bucket of FIG. 16 engages the water flow, the bucket root 76' will rotate to its stopped position and the extension 76" will pivot to its stopped position, both stopped positions being encountered for the physical reasons depicted herein.

4. Improvements in Existing Tidal/Wave Devices

Figure 9:
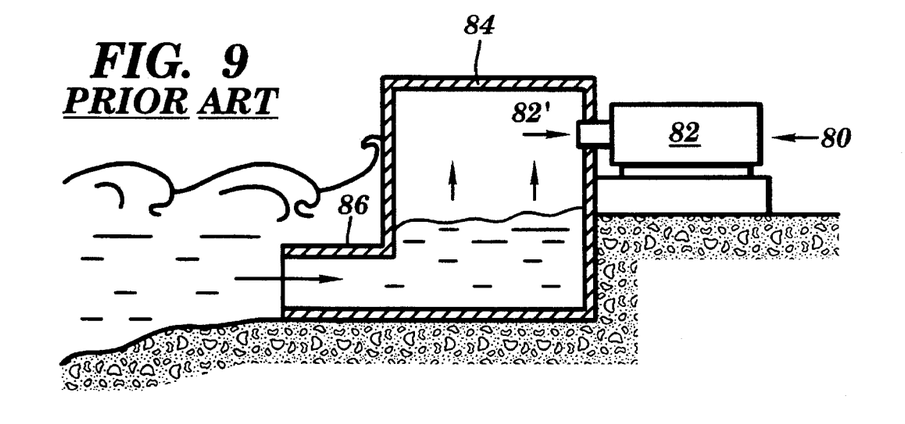
FIG. 9 is a schematic of the prior art.
Figure 10:
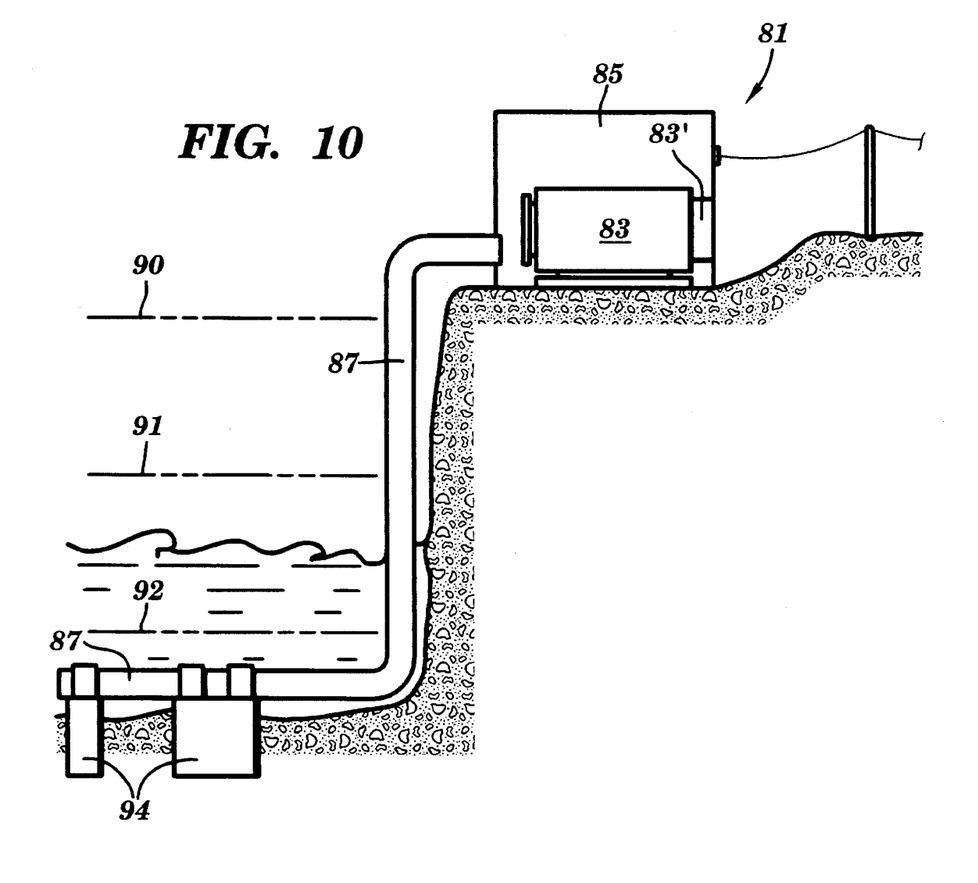
FIG. 10 is a schematic of an improvement to the FIG. 9 illustration.

A very practical, simple and inexpensive wave energy generator has been designed by the engineering staff of Queens university, Glasco, Scotland, which consisted of a small, firmly-built structure into which an incoming wave flows through an orifice, compressing air within an adjacent structure. Reference to FIG. 9 will acquaint the reader with the Queens University design 80 wherein an air turbine generator 82 is situated adjacent an inlet 82' and interconnectively with an enclosure 84. It should be noted that the enclosure integrity encompasses only the input of the air turbine generator and thus, as air pressure increases or decreases within the enclosure 84, air will be forced through the generator input 82' and out the generator exhaust end or drawn in from the exhaust end to enter the enclosure through the inlet 82', respectively. The normal operating mode for an air turbine generator is to have air flow (first) through one end and then, be literally "sucked" backed through from the other end. The internal mechanism of the generator is contrived to allow for this positive and negative air flow to keep the impeller and turbine shaft continuously spinning in the same direction. Other designs actually conceive of reversing the turbine angular motion and either producing an alternating electrical current or reversing plurality of the output network in order to maintain a pulsating direct current output. All these attributes of air turbine generators are well-known in the art and it is my purpose herein to improve on the Queens university design so as to obviate the necessity of placing the enclosure 84 and its generator 82 companion near the water so that the enclosure inlet 86 is sufficiently submersed and that an incoming wave will serve to raise the water level within the enclosure sufficiently to increase air pressure. The receding wave, will reduce the volume and hence the air pressure within the enclosure. Referring to FIG. 10, my improvement firstly raises the entire enclosure 85 generator 83 complex well above the storm tide line to a safe location. In distinction to the Queens university design 80, my instant improvement 81 conceives of the enclosure 85 completely enveloping the generator 83. More distinctively, the heightened and elongated air tube 87 does enter the enclosure, but well above the water. Most distinctively, the entire generator 83 is within the enclosure and the exhaust duct 83' vents from the generator to outside the enclosure 85; but, never at any time is the integrity of the exhaust duct 83' violated. My arrangement allows the enclosure to also act as a protective covering for the generator assembly. Further to my improvement 81, the vertical conduit 87 is extended below the storm tide line 90 and the high tide line 91 into the water just below the low tide line 92. There it is moored by suitable basing 94 so that the incoming waves, irrespective of tide level, will provide the requisite compression of air through the vertical portion of conduit 87. I conceive of several installations of this type colocated with a bridge emplacement of the system 10 or, in their AC generation mode, located along a coastline and connected to the local power grid.

FIG. 11 is an illustration of prior art which I have not sought to improve but which I feel is a useful adjunct proximate sites that I would select for installation of my invention. The Eling Tide Mill 94 was constructed about 1086 A. D. and rebuilt for modern usage in 1980. This particular mill is situated at South Hampton, England and first became known to me through the *Old Mill News*, Spring 1992, page 4. In order to operate, a tide mill has to have a dam 95 which creates a head of water in a tidal pond 96. At Eling, the sea hatches 97 situated at the east end of the causeway 95 are suspended like flaps and open by the force of the incoming tide 98. This allows the incoming sea water to enter the tidal pond and extend about two miles upstream in Bartley Water. This river feeds the inlet and provides some fresh water to mix with the incoming salt water. At high tide, the sea hatches slowly close and, as the tide ebbs, the impounded water makes the head required to run the mill 99. About one and a half hours after high tide, when the ebb tide falls enough to almost clear the water wheel 100, the sluicegate 101, inside the mill, is raised slowly to release the pent-up waters through a mill race to turn the wheel and drive the mill machinery. Although tidal mills produce limited amounts of power, they are totally reliable, allowing eight hours or more of generation, depending on the extent of the estuary. A DC generator is substituted for the mill stones and the energy developed is used for immediate electrolysis or it is transmitted to a production site to produce hydrogen and oxygen for CAVs and marine crafts. Should the causeway be part of a superstructure or the tidal mill located proximate a bridge of my preferred embodiment, the mill described becomes a powerful and (fuel) cost free adjunct, a prologue to the apparatus I will now describe in FIGS. 12 and 13.

Figures 12, 13:
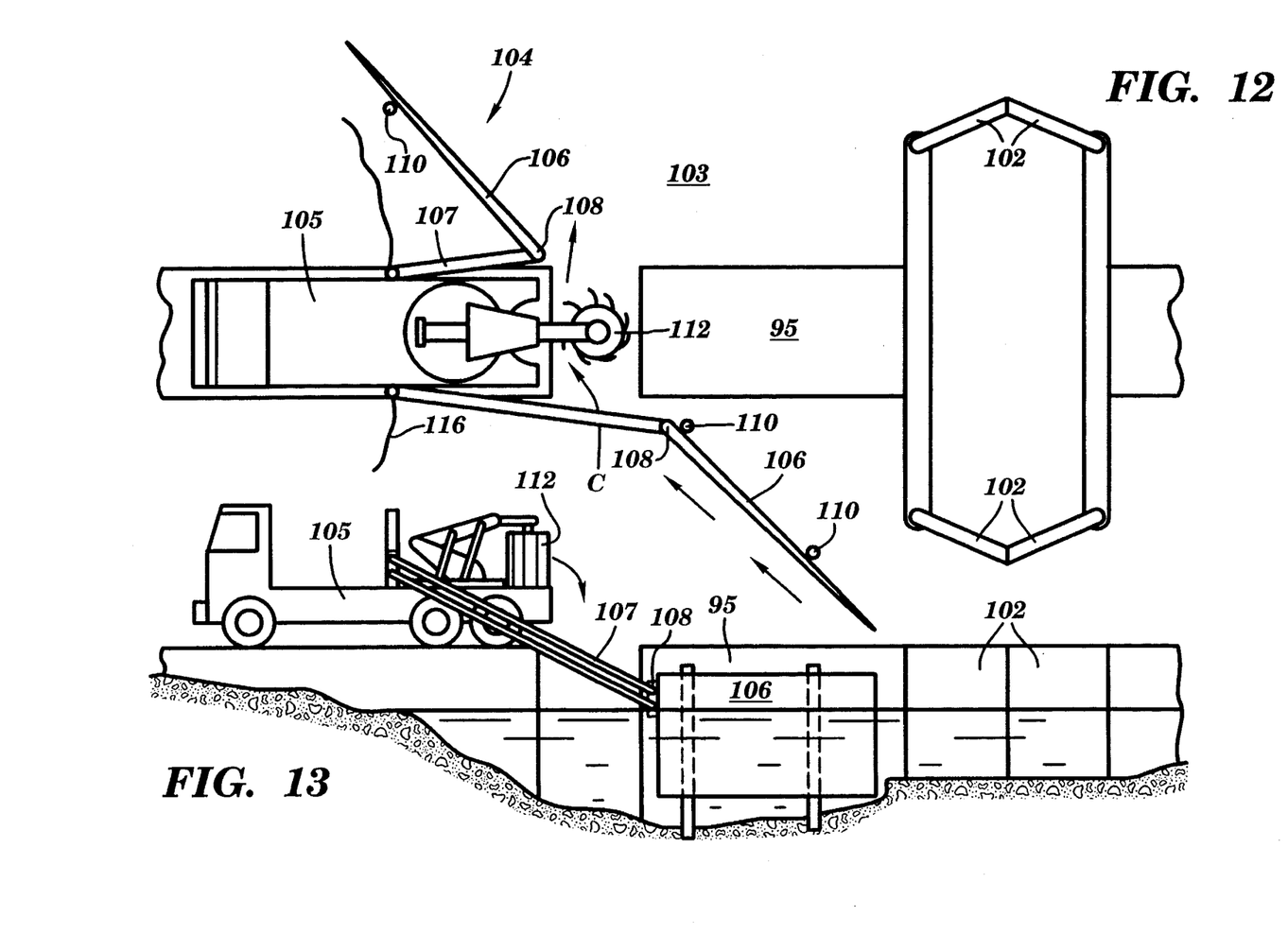
FIG. 12 is a plan of a mobile tidal mill.
FIG. 13 is an elevational illustration of the FIG. 12 mobile tidal mill.

In an estuary 103 in which is located a dam or causeway 95, which may or may not be equipped with the lock 102, a portion of the dam is opened to provide a channel C. On a moveable flatbed 105, as depicted in FIGS. 12 and 13, a pair of articulable, extendable weirs 106 are movably mounted for positioning on and off the flatbed by on-board hydraulic crane 107. Articulation of the weir is had at a hinge and each weir is positionable against fixed pilings 110 as shown. The purpose of the articulated weirs 106 is to direct tidal flow into the channel C in order to drive rotary tidal mill 112 which is a vertical axis mill having articulable vanes similar to those already discussed. The mill 112 is moveable between an onboard position and an immersed position via lift apparatus 112 on board the flatbed 105. Power take-off cable 116 is afforded for electrical hookup to battery storage or for use within the major system of the invention. The articulated weirs take advantage of the incoming and outgoing tidal flow.

The embodiments disclosed herein have been discussed for the purpose of familiarizing the reader with the novel aspects of this invention. Although preferred embodiments of the invention have been shown, many changes, modifications and substitutions may be made by one having ordinary skill in the art without necessarily departing from the spirit and scope of the invention as described in the hereinafter appended claims.

What is claimed is:

1. A site system for provision of electrical and fuel products for site servicing of vehicles and marine craft comprising in combination:

an elevated structure for providing a substantial base for said site and having an upper utility area and a lower utility area, said upper and said lower utility areas demarcated and defined by a roadway used by vehicles;

at least one electrical generation subsystem selected from a group consisting of a solar panel collector, a wind generator, a barge and a water power generation means, said subsystem located in either or both said upper or said lower utility areas;

conduction means for transferring electrical output of said subsystem to electrolysis means, said conduction means including switching means for shunting said electrical output to said electrolysis means or to electrical power storage means;

water supply means;

said electrolysis means for production of gaseous products while in electrical communication with said conduction means and receptive of water from said water supply means;

compression and storage means for receiving said gaseous products;

a multi-service station network for tapping into said compression and storage means, using said gaseous products for generating electrical power and, upon demand, for dispensing pure hydrogen and oxygen product; and an electric conversion means for generating alternating current power.

2. The system of claim 1 wherein said elevated structure is sited on a river, a valley, a fjord, a highway, a canal, a bay or a channel and comprises an overpass structure.

3. The system of claim 1 wherein said multi-service station network comprises one or more service modalities selected from the group consisting of a fuel cell charging station, a methane mixer-low emissions vehicle charging station and a zero emissions vehicle charging station, said modalities equipped to exchangeable rechargeable power sources.

4. The system of claim 1 wherein said electrical conversion means is a motor generator subsystem that includes a battery bank.

5. The system of claim 1 wherein said wind generator comprises:

an annular mounting;

rotational means over which said annular mounting may travel, said rotational means fixed to said superstructure enabling said annular mounting to rotate relative said superstructure;

a multiplicity of foramenous vanes disposed radially from an axis to individual, equally spaced points on said annular mounting and effecting, elevationally, a hemispheric silhouette, each vane of said multiplicity of vanes defined by a concave windward face, an opposite leeward face and a plurality of foramens therethrough, said vanes further comprising moveable foramen covers disposed over foramens of said plurality at said windward face so that, as said leeward face of a particular vane is presented to a wind force by said rotation, said moveable foramen covers on the windward side of said particular vane reflex and uncover their respective foramens; and power transmission means for transferring angular momentum of said annular mounting to an electrical power generation means.

6. The wind generator of claim 5 wherein said annular mounting comprises a ring for mounting said vanes of the generator and includes a mechanism that facilitates transfer of angular momentum from movement of said ring to an electric generator.

7. The wind generator of claim 6 wherein said mechanism comprises a means in the ring that is receptive therein of belt means.

8. The wind generator of claim 6 wherein said mechanism includes an annular gear tooth array disposed on the ring.

9. The system of claim 5 wherein said rotational means is a circular array of wheels which support said annular mounting and rotatably couple said mounting with the structure.

10. The system of claim 1 wherein said barge is a barge hull for anchoring in a flow and further comprises:

a tunnel means for admitting water flow through the barge hull, said tunnel means aligned centrally and longitudinally within said hull;

a moveable bucket assembly for immersion into a water stream and comprising a belt-disposed series of arcuate vanes operatively mounted about a series of wheels in pulley fashion in alignment with and over the tunnel means, said bucket means vertically moveable between a raised position above said tunnel and a lowered, immersed position into said tunnel and with each vane of said belt-disposed series being articulated and pivotally attached at a vane root thereof to said belt;

power take-off means for extracting mechanical energy from movement of the moveable bucket assembly and for delivering said mechanical energy to an electrical power generator; and anchoring means for securing the barge hull in a fore-aft orientation with respect to said tidal flow.

11. The system of claim 1 wherein said water power generation means is at least one subsystem selected from the group of subsystems consisting of fixed tidal mills, mobile tidal mills and wave actuated energy generators.

12. A compact system for production of electrical power and electrolysis products derivable economically from wind and solar energies and comprising:

an elevated bridge structure including horizontal and vertical platform means that afford vertical and horizontal mounting of equipment thereon;

a solar collector array fixed to vertical and essentially non-horizontal supports and superstructure of said bridge structure, said array electrically in communication with a switching means;

a group of vertical axis wind generators disposed on said platform means and/or suspended thereunder, said group electrically ganged to said switching means;

said switching means for connecting electrical output of said array and said group to a gas forming electrolysis equipment and, alternatively, to a battery means; and a water source for use by said gas forming electrolysis equipment.

13. The system of claim 1, where said barge comprising:

an elongated hull having a tunnel passing longitudinally therethrough, said hull bearing thereover an essentially flat deck;

an anchor means for mooring said barge in a tidal flow so that said tunnel is in alignment therewith;

one or more vertical axis wind generators disposed on said deck, said wind generators including first electrical power generators coupled thereto, said power generators connected to an electric power network and said network connected to a battery means;

a tunnel means for admitting water flow through the barge hull and aligned centrally and longitudinally therewith;

a moveable bucket assembly for immersion into a water stream and comprising a belt-disposed series of arcuate vanes operatively mounted about a series of wheels in pulley fashion and in alignment over the tunnel means, said bucket means vertically moveable between a raised position above said tunnel and a lowered position into said tunnel and with each vane of said belt-disposed series being articulated and pivotally attached at a root thereof to said belt;

power take-off means for extracting mechanical energy from movement of the moveable belt assembly and delivering said mechanical energy to at least a second electrical power generator, said at least second electrical power generator outputting to said electric power network; and at least one tidal mill generator disposed at an end of said tunnel means for providing electrical output to said electric power network.

14. The system of claim 13 further comprising a mobile tidal mill which is characterized by: a truck mounting a rotary mill having a vertical axis of rotation, said rotary mill possessing articulatively mounted buckets fixed circumferentially about and radiating outwardly of an axis which turns on said vertical axis of rotation, said rotary mill movably disposable by a hoist apparatus of said truck between said truck onboard first position and a first tidal flow-immersed position; and an articulated weir pair of panels projectable from said truck and movably disposable between a truck onboard second position and second and third tidal flow-immersed positions for urging tidal flow into contact with said rotary mill.

15. The system of claim 13 further comprising at least one water turbine hingedly disposed at an end of said hull proximate a water line thereof, said water turbine positionable between a raised, above-the-water position and an in-the-water, below the hull position.

16. The system of claim 15 further comprising an array of wave-actuated power generators staged alongside said hull and protruding downward below said water line, said array productive of electric power, said power transferrable by an electric conduction means to said electric power network.

17. The system of claim 12 wherein said structure comprises one or more service modalities selected from the group consisting of a fuel cell charging station, a methane mixer-low emissions vehicle charging station and a zero emission vehicle charging station, said modalities equipped provide to exchangeable rechargeable power sources.

18. An energy generating system for supplying usable power to transportation devices, comprising in combination:

a) a bridge, spanning between two parcels of land and extending over a source of water, the bridge having a roadway;

b) an electrical generation system for generating electrical power, including a solar powered generator, a wind powered generator, and a water powered generator, each mounted to the bridge respectively;

c) power storage means for storing electrical power generated from the electrical generation system; and d) power delivery means for delivering electrical power from the power storage means to eventually the transportation devices.

19. The generating system of claim 18, wherein the wind powered generator is mounted to a underside of the roadway; and the solar powered generator is mounted substantially above the roadway.

20. The generating system of claim 19, further comprising:

a) means coupled to receive electrical output from the electrical generation system for generating gases from water through electrolysis;

b) gas storing means for storing the gases; and c) generating means for generating electrical power from the gases.

* * * * *